(12) United States Patent
Noui et al.

(10) Patent No.: US 12,730,317 B2
(45) Date of Patent: Sep. 8, 2026

(54) LIGHT PROJECTOR MODULE

(71) Applicant: TriLite Technologies GmbH, Vienna (AT)

(72) Inventors: Louahab Noui, East Sussex (GB); Joerg Reitterer, Brunn am Gebirge (AT)

(73) Assignee: TriLite Technologies GmbH, Vienna (AT)

( * ) Notice: Subject to any disclaimer, the term of this patent is extended or adjusted under 35 U.S.C. 154(b) by 406 days.

(21) Appl. No.: 18/234,978

(22) Filed: Aug. 17, 2023

(65) Prior Publication Data

US 2024/0069348 A1 Feb. 29, 2024

(30) Foreign Application Priority Data

Aug. 23, 2022 (EP) .................................... 22191735
Oct. 6, 2022 (EP) .................................... 22200040

(51) Int. Cl.
*G02B 27/00* (2006.01)
*F21V 8/00* (2006.01)
(Continued)

(52) U.S. Cl.
CPC ....... *G02B 27/0172* (2013.01); *G02B 6/0016* (2013.01); *G02B 6/0031* (2013.01);
(Continued)

(58) Field of Classification Search
CPC ................ G02B 27/01; G02B 27/0101; G02B 27/0103; G02B 27/0149; G02B 27/017; G02B 27/0172; G02B 27/0176; G02B 27/0179; G02B 27/0189; G02B 2027/0105; G02B 2027/0107; G02B 2027/0109; G02B 2027/011; G02B 2027/0112;
(Continued)

(56) References Cited

U.S. PATENT DOCUMENTS 10,969,675 B1 * 4/2021 Wheelwright ..... G02B 27/0172
11,256,093 B2 2/2022 Curtis et al.
(Continued)

FOREIGN PATENT DOCUMENTS

GB 2556094 A * 5/2018 ........... G02B 5/1823

OTHER PUBLICATIONS

European Search Report issued in European Application No. 22200040.8-1020 on Aug. 30, 2023.
(Continued)

*Primary Examiner* — Henry Duong
(74) *Attorney, Agent, or Firm* — Hoffman & Baron, LLP

(57) ABSTRACT

A light projector module comprises a support, a light source for emitting in a beam path a light beam carrying said image, a MEMS mirror for deflecting the emitted light beam as a deflected light beam, and a waveguide with two parallel sides. The waveguide has an in-coupling section for coupling the deflected light beam into the waveguide and an out-coupling section for coupling the light beam out from the waveguide as an expanded light beam. An optical element lies beside the waveguide, overlaps the out-coupling section when seen in a direction perpendicular to the sides, and is configured to focus or defocus the expanded light beam as a focused or defocused output light beam.

19 Claims, 3 Drawing Sheets

(51) Int. Cl.
*G02B 26/08* (2006.01)
*G02B 27/01* (2006.01)
*G02B 27/14* (2006.01)

(52) U.S. Cl.
CPC ....... *G02B 6/0036* (2013.01); *G02B 26/0833* (2013.01); *G02B 27/144* (2013.01); *G02B 6/0073* (2013.01); *G02B 2027/013* (2013.01); *G02B 2027/0178* (2013.01)

(58) Field of Classification Search
CPC .... G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0136; G02B 2027/0134; G02B 2027/0138; G02B 2027/014; G02B 2027/0141; G02B 2027/0143; G02B 2027/0145; G02B 2027/0147; G02B 2027/015; G02B 2027/0154; G02B 2027/0152; G02B 2027/0156; G02B 2027/0158; G02B 2027/0159; G02B 2027/0161; G02B 2027/0163; G02B 2027/0165; G02B 2027/0169; G02B 2027/0167; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 6/0016; G02B 6/0031; G02B 6/0036; G02B 26/0833; G02B 27/144; G02B 6/0073; G02B 26/101
USPC .......................................................... 359/630
See application file for complete search history.

(56) References Cited

U.S. PATENT DOCUMENTS

| | | | | |
|---|---|---|---|---|
| 12,372,793 | B2 * | 7/2025 | Uhlendorf | G02B 27/0176 |
| 2016/0274360 | A1 * | 9/2016 | Inagaki | G02B 27/283 |
| 2019/0317598 | A1 | 10/2019 | Aleem et al. | |
| 2022/0163790 | A1 * | 5/2022 | Adema | G02B 27/0172 |
| 2022/0197034 | A1 | 6/2022 | Noui et al. | |
| 2024/0073401 | A1 * | 2/2024 | Jia | G02B 27/0172 |

OTHER PUBLICATIONS

European Patent Office Search Report corresponding to Application No. 22191735.4-1020, dated Feb. 17, 2023.
European Office Action dated Feb. 5, 2025.

* cited by examiner

LIGHT PROJECTOR MODULE

CROSS-REFERENCE TO RELATED APPLICATIONS

This application claims priority to the European Patent Applications No. 22 191 735.4 filed Aug. 23, 2022 and No. 22 200 040.8 filed Oct. 6, 2022, the disclosures of which are incorporated herein by reference.

TECHNICAL FIELD

The present disclosed subject matter relates to a light projector module.

BACKGROUND

An apparatus of this kind, as disclosed in EP 4 020 058 A1 of the same applicant, is commonly used in AR glasses, AR helmets or head-up displays for a broad range of applications like navigation, training, entertainment, education or work. A MEMS mirror deflects the light beam into subsequent directions (angles), one direction (angle) per pixel of the image. For example, the MEMS mirror oscillates fast about a vertical axis and slowly about a horizontal axis to sweep the directions and, thus, scan the pixels row by row and line by line. The deflected light beam passes a waveguide which enlarges the beam in cross-section—for a so-called "exit pupil" or "eye box" expansion—onto a display viewed by the user.

In VR applications, the display is typically a (miniature) reflective screen in front of the user's eye. In AR applications the display is a semi-transparent combiner which redirects the light beam/s towards the user's eye while concurrently superposing them with light field from a surrounding. In either case the cornea and the lens of the user's eye focus each light beam from a specific direction onto one image point on the retina, so that all image points on the retina then form the image perceived by the user. In video beamer applications the light projector module can be used to project an image onto an external screen like a reflective wall or movie screen. In some applications the light projector may even project the scanned light beam/s directly into the user's eye, without any reflective screen or semi-transparent combiner.

For light projector modules used in VR or AR glasses, helmets and other head-mounted projectors it is desirable to allow for shifting the object plane of the image and/or for magnifying the image, while building the module as small as possible to increase wearability and portability.

BRIEF SUMMARY

It is thus an object of the present disclosed subject matter to provide a light projector module which allows for object plane shifting and/or for image magnification and is compact for optimal user comfort.

This object is achieved with a light projector module projecting an image, comprising:

a support;

a light source supported by the support and configured to emit in a beam path a light beam carrying said image;

a micro-electro-mechanical-system (MEMS) mirror supported by the support and configured to deflect the emitted light beam received over the beam path as a deflected light beam;

a waveguide with two parallel sides, supported by the support and having an in-coupling section configured to couple the deflected light beam into the waveguide, a guiding section configured to guide the deflected light beam through the waveguide as a guided light beam, an out-coupling section configured to couple the guided light beam out from the waveguide as an expanded light beam whose cross section is larger than the cross section of the deflected light beam; and an optical element which lies beside the waveguide, overlaps the out-coupling section when seen in a direction substantially perpendicular to the sides of the waveguide, and is configured to focus or defocus the expanded light beam as a focused or defocused output light beam.

The disclosed arrangement of the light source, MEMS mirror waveguide and optical element allows to expand the exit pupil and at the same time to shift the object plane of the image to a desired position and to project the image at a desired magnification. Thus, the light projector module can project a sharp image at any desired distance and size while allowing for a movement of a user's eye within a large eye box. For example, a focused image of a desired size may be displayed at a distance within an armlength of a worker to augment a work place surrounding while the worker may change his or her gaze to carry out a task. Moreover, having the optical element directly besides the waveguide and overlapping the out-coupling section allows to use a small optical element which still receives the expanded light beam for a wide range of directions. This leads to a tight integration and compact design and, thus, to an optimal user comfort, wearability and portability.

The optical element may provide the output beam simply with a spherical wavefront. However, in an optional embodiment the optical element is configured to provide the output light beam with an aspherical wavefront to reduce or avoid optical aberrations such as spherical and comatic aberrations, e.g., of the human eye or other optics downstream the optical element, and to project a particularly sharp image.

The optical element may direct the scanned light beam directly into the user's eye, e.g. in VR applications. In an advantageous embodiment the light projector module further comprises a display, in particular a semitransparent combiner or a mirror, supported by the support and configured to direct the output light beam as an image light beam towards the user's eye for projection. For AR applications the display may be a semitransparent combiner, e.g. a semitransparent mirror, a holographic optical element (HOE) or a further waveguide, to superpose the output light beam with the light field of the surrounding; for VR applications, the display may be opaque on one side to block the light field of the surrounding and reflective on its other side to project only the output light beam towards the user's eye.

The interplay of the display and the optical element allows to generate image light beams with a wide variety of shapes, in particular when the output light beam is provided with an aspherical wavefront. Hence, the image beam shape can be adapted to the specific application. The disclosed subject matter provides for two particularly advantageous embodiments of this interplay.

In the first advantageous embodiment the optical element and the display in combination provide the image light beam with a planar wavefront. Thereby, the object plane of the image is located at infinity and a sharp image is seen when the user's eye is relaxed. In addition, the optical element and the display may form a particularly simple magnification optics, e.g. similar to a telescope, which magnifies the angular differences of the expanded light beam at subsequent MEMS mirror orientations and, thus, the projected image.

In the second advantageous embodiment the optical element and the display in combination provide the image light beam with a spherical wavefront. Thereby, the object plane of the image can be shifted to a desired finite distance simply by adjusting the (fictitious) origin of the spherical image light beam. Consequently, objects in the projected image can be sharply seen at the finite distance and, in AR applications, simultaneously with real objects located at that distance.

Two beneficial embodiments of the optical element are provided for said focusing or defocusing of the expanded light beam.

In the first beneficial embodiment the optical element is a transmissive optical element, in particular a transmissive hologram, a transmissive diffractive optical element (DOE), a diffractive meta surface, or a liquid lens. In this way, the output light beam traverses the optical element in a direction away from the waveguide and is, thus, not affected thereby. In an optional variant of this embodiment the waveguide has a mirror or a reflective coating at that of said two sides that is far from the optical element. In case of a bi-directional out-coupling section, this mirror or coating reflects that part of the expanded light beam that would be coupled-out in a "wrong" direction, i.e. away from the optical element, back towards the optical element and, thus, increases the light efficiency of the projector module.

In the second beneficial embodiment the optical element is a reflective optical element, in particular a reflective hologram, a reflective diffractive optical element (DOE), a reflective meta surface, or a liquid mirror. In this way, only the reflective side of the optical element has to be considered when tailoring the focusing or defocusing effect of the optical element. In an optional variant of this embodiment the waveguide has a quarter wave plate between the out-coupling section and the optical element and a polariser at that of said two sides that is far from the optical element. In case of a bi-directional out-coupling section, the light source can emit a polarised light beam, such that the polariser absorbs that part of the expanded light beam which would be coupled out directly, i.e. in a "wrong" direction away from the optical element without being focused or defocused, while letting pass the output light beam with altered polarisation. Hence, the image light beam can be projected free from any unwanted light.

In all embodiments, when a hologram, DOE or meta surface is used as the optical element, it can be made particularly flat and the light projector module can be particularly compact; and when a liquid lens or mirror is used as the optical element, its surface may be dynamically adjusted and, therewith, the waveform of the output beam.

To allow for a dynamic shift of the focal point of the optical element, it is favourable when the optical element is supported movably in the direction substantially perpendicular to the sides of the waveguide. Thereby, the object plane shift and/or the magnification of the image may be dynamically adjusted by moving the optical element.

In a favourable embodiment the optical element lies beside the waveguide at a distance therefrom which is larger than 10 μm, optionally larger than 50 μm, and which is smaller than 1 cm, optionally smaller than 2 mm. Such a distance is as large as to avoid an unwanted leakage of the light beam out from a waveguide working with total internal reflection and as low as to keep the projector module small and compact.

In a further embodiment the optical element is mounted on the waveguide which, in turn, is supported by the support. In this way the optical element and the waveguide can be steadily and accurately aligned with each other.

The optical element may optionally be mounted on the waveguide via a circumferential rim or a set of rails or studs to ease alignment during assembly.

Alternatively, the optical element may abut against the waveguide. For a particular compact design and a particular accurate alignment the waveguide and the optical element may be formed as a stack on a common wafer.

To obtain an expanded light beam with a particularly homogenous intensity, it is beneficial when the out-coupling section has an out-coupling efficiency increasing with distance from the in-coupling section.

The disclosed light projector module can be employed in a variety of designs. In a particularly tight and compact design, the light projector module further comprises a static mirror which lies, in the beam path from the light source to the MEMS mirror, beside the waveguide and overlaps the waveguide when seen in the direction substantially perpendicular to the sides of the waveguide, and is configured to fold the beam path about an angle of folding. Thereby, the light beam is guided in an optimised path through the module.

In all embodiments the light source may comprise three LEDs or laser diodes for emitting red, green, and blue beams of light, respectively, and a beam combiner for combining the beams of light to said light beam, to project a colour image.

BRIEF DESCRIPTION OF THE DRAWINGS

The disclosed subject matter will now be described by means of exemplary embodiments thereof with reference to the enclosed drawings, in which show.

DETAILED DESCRIPTION

Figure 1:
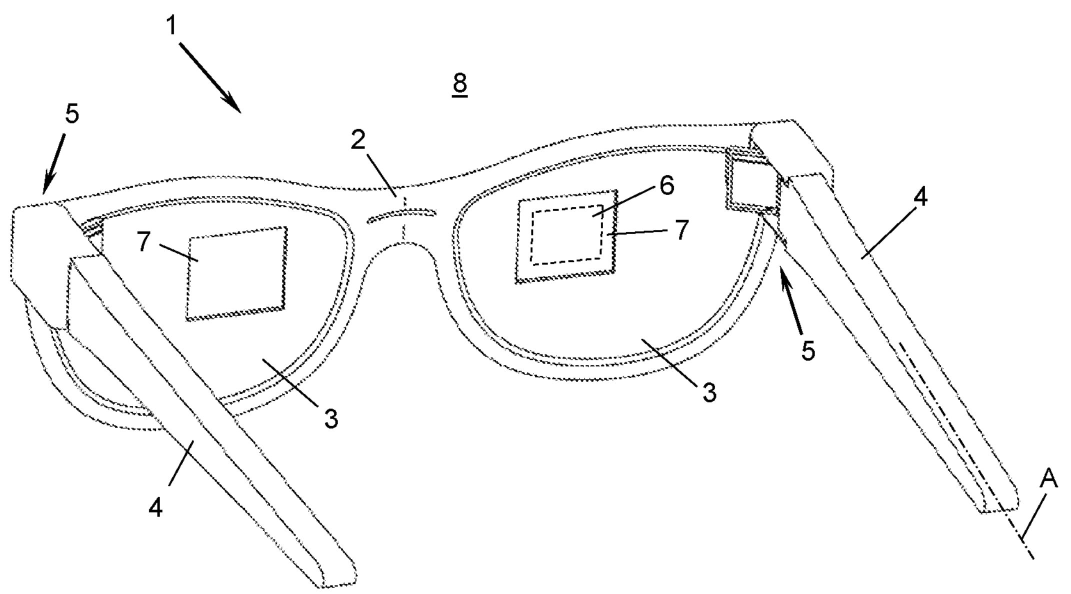
FIG. 1 a light projector module of the disclosed subject matter integrated into a pair of AR glasses in a perspective view.

FIG. 1 shows a pair of augmented reality (AR) glasses 1 comprising a spectacle frame 2, a pair of eye glasses 3 and a pair of temples 4. Attached to each temple 4 is a light projector module 5 which projects an image 6 onto a display (here: a semi-transparent combiner 7). The semi-transparent combiner 7 is supported by the spectacle frame 2 or an eyeglass 3 or integrated into the latter. The semi-transparent combiner 7, e.g., a semi-transparent mirror, a waveguide or a holographic combiner, superposes the image 6 projected by the light projector module 5 with the light field from a surrounding 8 so that the wearer of the AR glasses 1 can see the image 6 overlaying ("augmenting") the surrounding 8.

The image 6 can, e.g., be monochromatic or coloured, a single image or part of a video sequence of images. The image/s 6 can augment any surrounding 8 such as a landscape, an urban environment, a road, a classroom, a workplace etc. so that the user can perceive additional information, e.g., for navigation, work, education, training or entertainment as an overlay ("AR image") of the light field ("view") of the surrounding 8.

In the example of FIG. 1, the light projector module 5 (here: two modules 5, one per temple 4) is built into AR glasses and used in combination with a semi-transparent combiner 7. A similar application of the light projector module 5 could be in an AR helmet worn by a user, a handheld AR device like a smartphone with a camera, or an AR head-up display for a vehicle which all use a semi-transparent combiner 7 as the display of the light projector module 5. If desired, suitable relay optics can be interposed between the light projector module 5 and the semi-transparent combiner 7.

Instead of the semi-transparent combiner 7 the light projector module 5 could be used with any other display, e.g., a mirror, a conventional reflective projection screen such as a miniature screen mounted on the frame 2 of virtual reality (VR) glasses, or a projection wall or a movie screen, for example when the light projector module 5 is used as a miniature (or full-scale) video beamer. The light projector module 5 could even be used to project the image 6 directly into the user's eye, optionally with suitable optics therebetween.

Figure 2:
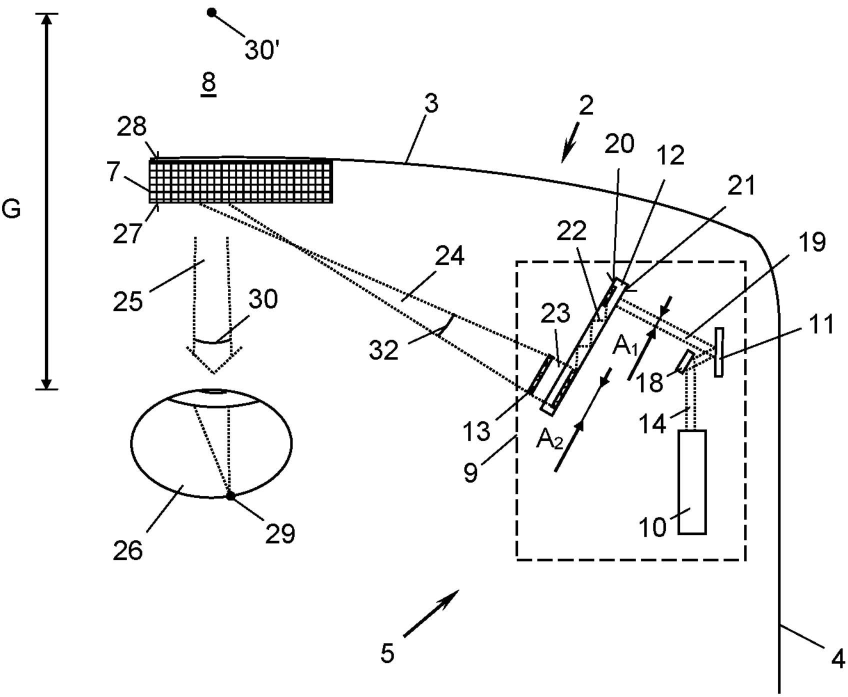
FIG. 2 a first embodiment of the electro-optical components of the light projector module of FIG. 1 with a transmissive focusing optical element and a holographic combiner in a schematic top view.
Figure 3:
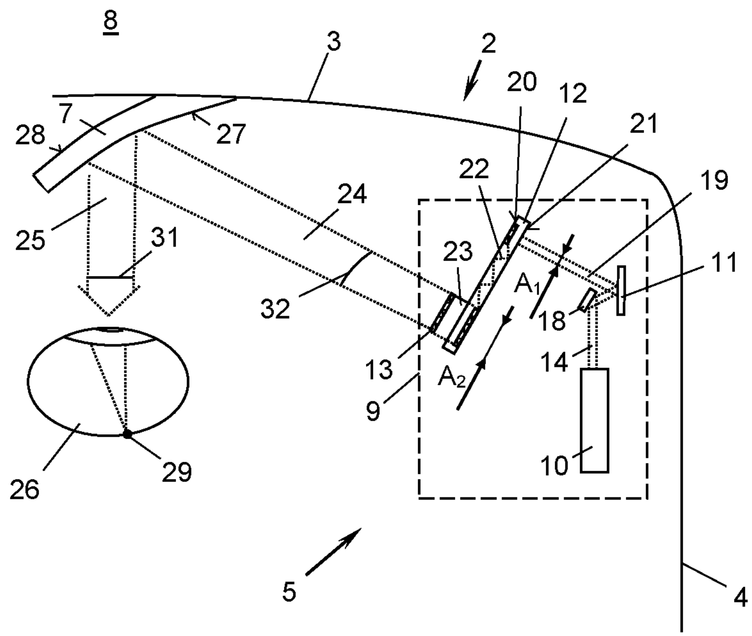
FIG. 3 a second embodiment of the electro-optical components of the light projector module of FIG. 1 with a transmissive defocusing optical element and a mirror combiner in a schematic top view.
Figure 4:
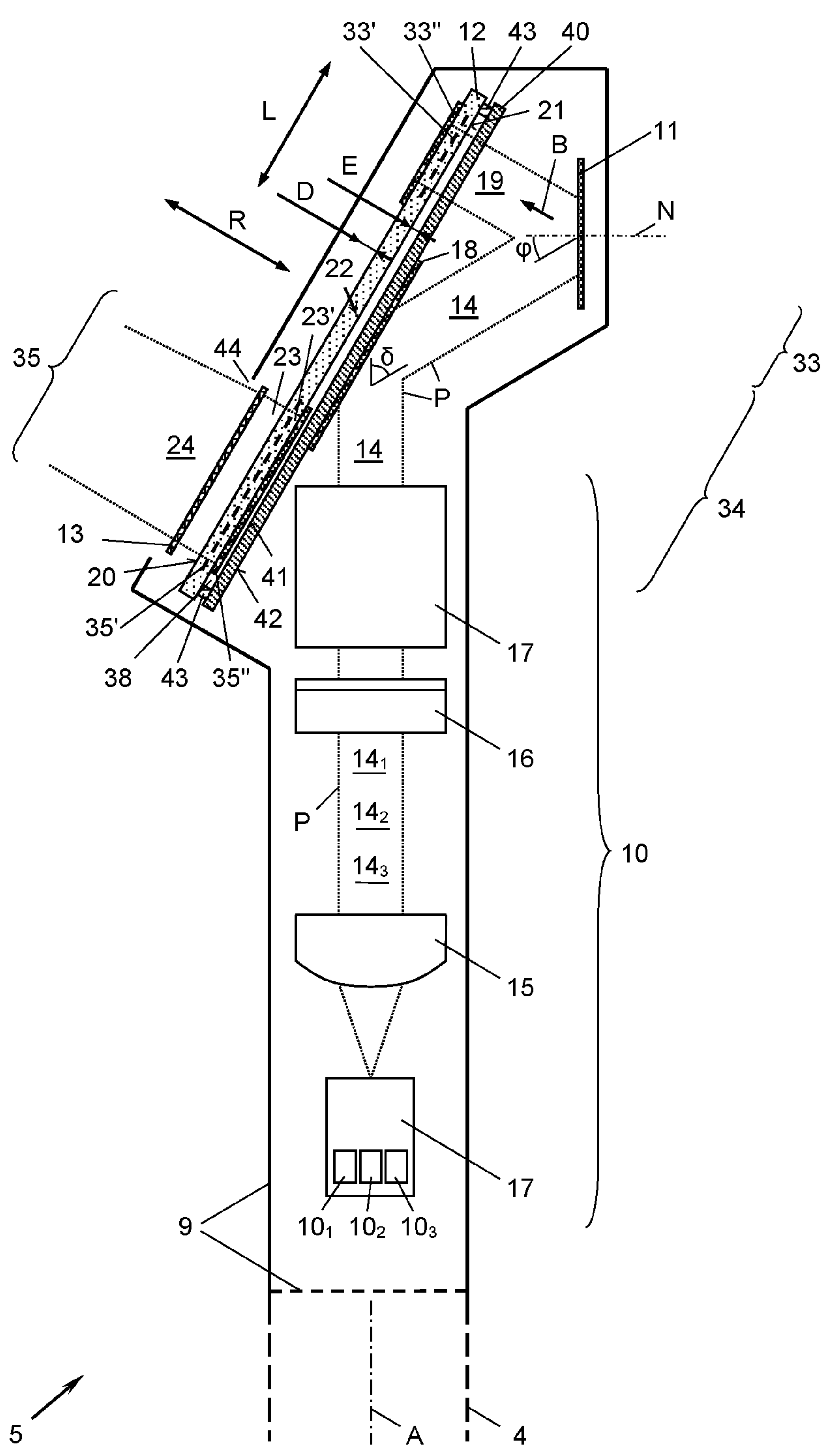
FIG. 4 the light projector module of FIGS. 1-3 in a sectional top view.

The light projector module 5 can be built into a separate housing 9, illustrated in FIGS. 2 and 3 by dashed lines and in FIG. 4 by solid lines and the horizontal dashed line, or be directly integrated into the spectacle frame 2 or one of its temples 4, i.e., use the spectacle frame 2 or a temple 4 as its housing 9.

As shown in FIGS. 2-4, the housing 9 forms a support for the primary components of the light projector module 5, that are: a light source 10, a micro-electro-mechanical-system (MEMS) mirror 11, a waveguide 12 and an optical element 13.

The light source 10 emits a collimated light beam 14 which carries the image 6 in a time-multiplexed manner, i.e. the intensity values of the image pixels one after the other, e.g., row-by-row and line-by-line per image 6 comprised of a grid of pixels, and image-by-image per video comprised of a sequence of images 6.

For this purpose the light source 10 can be of any type known in the art configured to emit a collimated light beam 14. In most embodiments, the light source 10 is a semiconductor light source such as a light emitting diode (LED), microLED (iLED), or laser diode, e.g., edge-emitting laser diode or surface-emitting laser diode. For colour images 6, the light source 10 may be a polychromatic light source 10, e.g., comprise three LEDs or laser diodes 101, 102, 103 of the three primary colours red, green and blue which emit a red, green and blue beam of light $\mathbf{14}_1$, $\mathbf{14}_2$, $\mathbf{14}_3$, respectively, that are fed—e.g. via one or more lenses 15, 16—to a beam combiner 17 that combines the beams $\mathbf{14}_1$, $\mathbf{14}_2$, $\mathbf{14}_3$ to the light beam 14. The lenses 15, 16 may be common to all beams $\mathbf{14}_1$, $\mathbf{14}_2$, $\mathbf{14}_3$ or comprise one or more individual lense/s (not shown) for each beam $\mathbf{14}_1$, $\mathbf{14}_2$, $\mathbf{14}_3$.

The beam path P of the light beam 14 downstream of the light source 10, drawn in dotted lines in FIGS. 2-4, is optionally folded (diverted) by a static mirror 18 by an angle of folding 5, here: away from the user towards the outside of the temple 4. The angle of folding 5 is in the range of 45° to 75° and in the present example about 60°.

Downstream of the light source 10 (here: downstream of the optional static mirror 18) the beam path P with the light beam 14 impinges on the MEMS mirror 11. The MEMS mirror 11 deflects the light beam 14 as a (collimated) "deflected" light beam 19 into subsequent directions (angles) B, one direction B per pixel of the image 6, towards the waveguide 12. The MEMS mirror 11 can, e.g., oscillate fast about a vertical axis and slowly about a horizontal axis to sweep the directions B and, thus, reproduce the pixels of an image 6 row-by-row and line-by-line, and image-by-image for a sequence of images 6. Alternatively, the MEMS mirror 11 can sweep ("scan") the directions B by any other movement, e.g., by means of Lissajous curves, to reproduce the image/s 6.

The MEMS mirror 11 has a resting position (shown in FIG. 4) about which it oscillates, and the folded beam path P of the light beam 14 impinges on the MEMS mirror 11 in that resting position under an angle of incidence φ of 15° to 45°, in the present example about 30°. The angle of incidence φ is measured with respect to a normal N on the mirror plane of the MEMS mirror 11.

The waveguide 12 receives the deflected light beam 19 from the MEMS mirror 11 and guides it between its two parallel sides 20, 21 as a "guided" light beam 22 towards the semitransparent combiner 7. On its way through the waveguide 12 the guided light beam 22 is expanded (enlarged) in its cross section so that it exits the waveguide 12 as a (collimated) "expanded" light beam 23 with a cross section $A_2$ which is larger than the cross section $A_1$ of the deflected light beam 19. For example, the cross sections $A_1$, $A_2$ of the deflected and expanded light beams 19, 23 can be 0.5-4 $mm^2$ and 8-150 $mm^2$, respectively.

Downstream of the waveguide 12 the optical element 13 and the semitransparent combiner 7 reshape the expanded light beam 23 for the user. To this end, the optical element 13 focuses (FIG. 2) or defocuses (FIG. 3) the expanded light beam 23 as an "output" light beam 24, and the semitransparent combiner 7 redirects the output light beam 24 as an "image" light beam 25 towards the user's eye 26 for superposing the image 6 with the light field of the surrounding 8. In the depicted case of AR glasses 1, the semitransparent combiner 7 not only re-directs the output light beam 24 impinging on its one side 27 facing the user's eye 24 but also lets pass the light field of the surrounding 8 impinging on its opposite side 28, i.e., its far side with respect to the eye 26, so that the user perceives both the AR image 6 as well as the surrounding 8.

The user's eye 26 is an optical system per se whose cornea and lens focus the image light beam 25 onto one image point 29 on the retina per direction B and angle (ID, i.e. per pixel. For example, in case of a perfectly collimated (parallel) image light beam 25 per direction B, the eye 26 will let the image 6 appear in an object plane at infinity. Depending on their forms and optical powers, the optical element 13 and the semitransparent combiner 7 can magnify the image 6 and/or shift the image 6 to a desired object plane, i.e. to appear at a viewing distance G of, e.g., 40-60 cm from the eye 26 by reshaping the expanded light beam 23.

In the embodiment of FIG. 2 the (here: transmissive) optical element 13 focuses the expanded light beam 23 and the semitransparent combiner 7 (here: a holographic combiner) reshapes the focused output light beam 24, e.g. similar to a diverging or converging lens or mirror, such that the image light beam 25 has a spherical wavefront 30. Thus, the user perceives the image light beam 25 for a specific direction B, i.e. a specific pixel, as emanating from a (fictitious) origin 30' of the spherical wavefront 30 at a finite distance G from the eye 26. By shifting the origin of the image light beam 25 for all directions, i.e. for all pixels, to the same distance G, the whole image 6 is perceived at this distance G.

In the embodiment of FIG. 3 the (here: transmissive) optical element 13 defocuses the expanded light beam 23 and the semitransparent combiner 7 (here: a semitransparent mirror of arbitrary curvature known as "freeform combiner") collimates the defocused output light beam 24, e.g. similar to a converging mirror, such that the image light beam 25 has a planar wavefront 31. Depending on the optical powers of the optical element 13 and the semitransparent combiner 7, an angular difference of the expanded light beam 23 for subsequent directions B can be increased or decreased and, thus, the projected image 6 be magnified by a magnification factor M>1 or M<1 ("reduced"), respectively.

Of course, the combination of the optical element 13 and the semitransparent combiner 7 may provide a wide variety of beam shapes of the image light beam 25 with different vergences, magnifications, (a) sphericities, intensity profiles, distortion corrections, etc. Therefor, optical parameters of the optical element 13 and the semitransparent combiner 7 such as their optical powers and forms may be adapted. For instance, the optical element 13 may optionally provide the output light beam 24 with a (non-planar) aspherical wavefront 32, e.g. to ease the shaping of the image light beam 25 in the semitransparent combiner 7, to reduce aberrations and to sharpen the perceived image 6.

FIG. 4 shows an arrangement of the components light source 10, static mirror 18, MEMS mirror 11, waveguide 12 and optical element 13 on the support, here: the housing 9. As discussed before, the housing 9 can be the temple 4 itself or any other structure, even a lattice- or scaffold-like structure.

To achieve a slim and compact design of the module 5 while keeping the angle of incidence φ on the MEMS mirror 12 as low as possible, the space underneath the rear side 21 of the waveguide 12 is used as a mounting position for the static mirror 18. This allows the beam path P from the light source to the static mirror 18 to run substantially parallel to the longitudinal axis A of a temple 4 when the module 5 is used in AR or VR glasses, yielding a slim design.

The waveguide 12 has an in-coupling section 33 for coupling the deflected light beam 19 into the waveguide 12, a guiding section 34 for guiding the guided light beam 22 through the waveguide 12 and an out-coupling section 35 for coupling out the expanded light beam 23. The out-coupling section 35 of the waveguide 12 is larger than the in-coupling section 33, roughly by the enlargement ratio $A_2$:$A_1$.

The in-coupling section 33 may be formed by a diffraction grating 33' which diffracts the deflected light beam 19 mainly into one diffraction order, e.g., into the first diffraction order to couple the deflected light beam 19 under an angle above the critical angle of total internal reflection into the waveguide 12. Instead of the diffraction grating 33' any other element for coupling the deflected light beam 19 under said angle into the waveguide 12 may be employed such as a prism, a fibre, etc.

The waveguide 12 internally guides the in-coupled deflected light beam 19 in its guiding section 34 via a series of successive total internal reflections between its sides 20, 21 towards the out-coupling section 35, which may be in form of an out-coupling diffraction grating 35'. Instead of the diffraction grating 35' any other element for coupling the expanded light beam 19 out from the waveguide 12 may be employed as out-coupling section 35 such as one or several semitransparent mirrors, a multitude of successive micromirrors, one or more prisms, fibres, etc. In any case, the out-coupling section 35 may have a an out-coupling coupling efficiency increasing with distance to compensate for intensity losses that occur with every coupling-out of a portion of the guided light beam 22.

Any or both of the diffraction gratings 33', 35' can be applied into or onto the waveguide 12 by e.g., etching, pressing or moulding surface structures like steps, grooves, ridges etc., or embedded into the waveguide 12, e.g., in the form of structured voids or reflective films. Moreover, any or both of the diffraction gratings 33', 35' can be a reflection or a transmission grating. In optional embodiments, the waveguide 12 has a mirror 33" behind the in-coupling diffraction grating 33', i.e., at its far side with respect to the deflected light beam 19, and/or reflectorised sides 20, 21 between the in- and out-coupling areas 33, 35, and/or a mirror 35" behind the out-coupling diffraction grating 35', i.e., at its far side with respect to the out-coupled light beam 23. In all these embodiments the mirrors 33", 35" could also be distanced from the corresponding side 20, 21, e.g., by an air gap of a few microns or more.

The optical element 13 lies beside the waveguide 12 in a region where it overlaps the waveguide 12 when seen in a direction R perpendicular to the sides 20, 21 of the waveguide 12. As the optical element 13 lies beside, i.e. close to, the waveguide 12, the optical element 13 can be small in a lateral direction L parallel to the sides 20, 21 and still receive the extended light beam 23 for a wide variety of directions B. The waveguide 12 and the optical element 13 may optionally be formed as a stack on a common wafer, e.g. as a stack of layers deposited on a common wafer substrate.

As shown in FIG. 4 the optical element 13 can be distanced from the waveguide 12 by an air gap, for instance with a distance D that is larger than 10 μm, e.g. larger than 50 μm, and smaller than 1 cm, e.g. smaller than 2 mm. Alternatively, the optical element 13 can abut against the waveguide 12. In any case, the optical element 13 can either be supported directly by the support 9 or be mounted on the waveguide 12.

To optionally move the optical element 13 and thereby dynamically shift its focus, the optical element 13 can be supported or mounted movably in the direction R, e.g. drivably by an actuator (not shown).

With reference to FIGS. 2-5, two different positionings and types of the optical element 13 shall now be described.

In the embodiments of FIGS. 2-4 the optical element 13 is used in transmission and, thus, mounted in front of the waveguide 12 when seen from the user. To achieve the abovementioned beam focusing or defocusing in transmission, the (transmissive) optical element 13 could be a static optical lens. Alternatively, flat optics such as a transmissive hologram, a transmissive diffractive optical element (DOE), a transmissive diffractive meta surface (also known as "meta lens"), etc. may be used for a compact design, or dynamically controllable optics such as a liquid lens for a dynamic variation of its form and optical power. Such a liquid lens may, e.g., include a liquid with a controllable bulk such as a liquid crystal, a liquid with a controllable surface, a mixture of liquids with a controllable interface, etc.

When the optical element 13 is used in transmission, the mirror 35" or a reflective coating may optionally be arranged at that side 21 of the waveguide 12 that is far from the optical element 13. The mirror 35" and/or the coating can reflect a part 23' of the expanded light beam 23 which would be coupled out in the "wrong" direction, i.e. away from the optical element 13, and, thus, be lost without the presence of the mirror 35" or coating.

Figure 5:
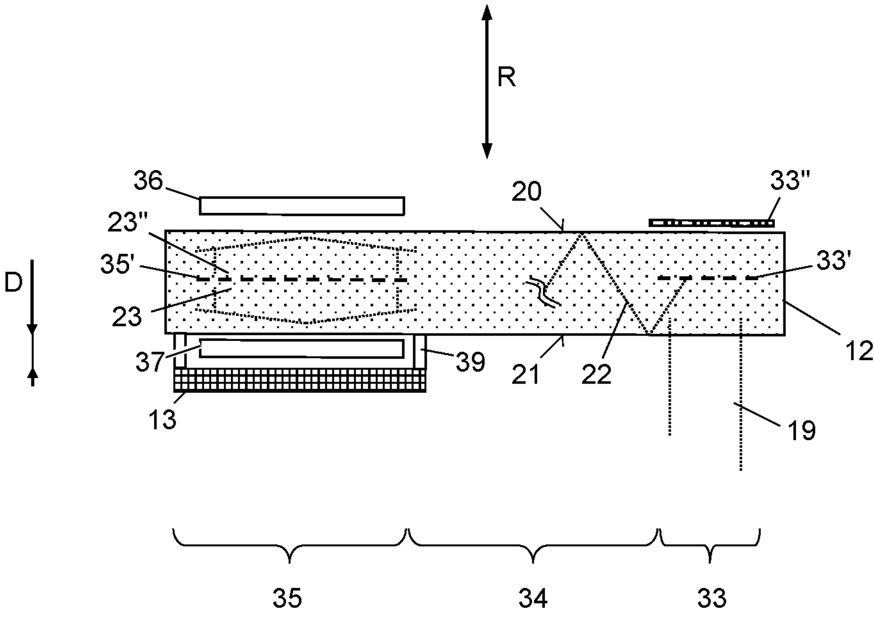
FIG. 5 an embodiment of a reflective optical element of the light projector module of the disclosed subject matter in a sectional top view.

In the embodiment of FIG. 5 the optical element 13 is used in reflection and, thus, mounted rear of the waveguide 12 when seen from the user. To achieve the abovementioned beam focusing or defocusing in reflection, the (reflective) optical element 13 could be a converging or diverging mirror. Again, for a compact design flat optics such as a reflective hologram, a reflective diffractive optical element, a reflective diffractive meta surface, etc. may be used, or dynamically controllable optics such as a liquid mirror for a dynamic variation of its form and optical power. Such a liquid mirror may, e.g., include a liquid with a controllable bulk such as a liquid crystal, a liquid with a controllable surface, a mixture of liquids with a controllable interface, etc.

When the optical element 13 is used in reflection, a polariser 36 and a cooperating quarter wave plate 37 may optionally be employed as shown in FIG. 5. In the embodiment of FIG. 5 the light source 10 emits the light beam 14 with a specific polarisation, e.g. a circular or linear polarisation, that can be filtered out by the polariser 36. Hence, a part 23" of the expanded light beam 23 which would be coupled out in the wrong direction away from the optical element 13 cannot pass the polariser 36, whereas the rest of the expanded light beam 23—which changes its polarisation after passing the quarter wave plate 37 and is focused or defocused by the refractive optical element 13—may pass the polariser 36, as desired.

Coming back to FIG. 4, it can be seen that due to the internal waveguiding structure of the waveguide 12 the in-coupling section 33 and the out-coupling section 35 do not overlap when seen in the direction R. Therefore, there is installation space available beside the side 21 for mounting the static mirror 18. The static mirror 18 therefore lies beside the side 21 in a region where it will overlap the waveguide 12 when seen in the direction R, for optimal compactness of the design. Optionally, an air gap 38 may remain at the side 21 of the waveguide 12 so that its internal waveguiding function can work properly with total internal reflection at that side 21. The air gap 38 may be established, e.g., by mounting the static mirror 18 at a distance from the side 21, which distance may be in the range of a few microns or millimetres.

As mentioned above, the optical element 13 can be mounted on the waveguide 12, e.g. via a circumferential rim (not shown) or a set of edge rails or individual studs 39 at the edges (FIG. 5). In some embodiments, the waveguide 12 will be provided with a transparent cover 40 (FIG. 4), e.g. a thin glass plate, which is mounted at a distance E from the side 21 to protect the waveguide 12. Such a cover 40 can optionally be co-used to carry the optical element 13 (when reflective), the mirror 35" and/or the static mirror 18 (FIG. 4). In particular, the one side 41 of the transparent cover 40 that faces the side 21 of the waveguide 12 can be used to support the (reflective) optical element 13 and/or the mirror 35", and the other side 42 of the transparent cover 40 can be used to support the static mirror 18, for example by coating the side/s 41 and/or 42 with a reflective coating.

The transparent cover 40 and the waveguide 12 can be attached to one another via a circumferential rim (not shown) or a set of spacers or studs 43. The transparent cover 40 can be mounted in the housing 9 and carry the waveguide 12.

Of course, instead of or in addition to the transparent cover 40, a further transparent cover (not shown) could be located at the other side 20 of the waveguide 12 and be co-used to carry the (transmissive) optical element 13, e.g. in the form of a diffractive coating, etching or machining.

The housing 9 is configured to support and optionally enclose the light source 10, the MEMS mirror 11, the waveguide 12, the optical element 13, the optional static mirror 18 and the optional transparent cover 40. The housing 9 may have a window 44 exposing the out-coupling section 35 of the waveguide 12 and the optical element 13 so that the focused or defocused light beam 24 can exit the housing 9. The window 44 may be provided with a further transparent cover such as a glass plate.

In the embodiments of FIGS. 2-5 the light beam 14 is guided through the waveguide 12 in a Z-shaped manner, i.e., entering the waveguide 12 on its "rear" side 21 and leaving the waveguide 12 on its "front" side 20. Alternatively, the light beam 14 may be guided through the waveguide 12 in a different way, for instance, in a U-shaped manner, i.e., entering and leaving the waveguide 12 on the front side 20 or the rear side 21.

The disclosed subject matter is not restricted to the specific embodiments described in detail herein, but encompasses all variants, modifications and combinations thereof that fall within the scope of the appended claims.

What is claimed is:

1. A light projector module projecting an image, comprising:

a support;

a light source supported by the support and configured to emit in a beam path a light beam carrying said image;

a micro-electro-mechanical-system (MEMS) mirror supported by the support and configured to deflect the emitted light beam received over the beam path as a deflected light beam;

a waveguide with two parallel sides, supported by the support and having an in-coupling section configured to couple the deflected light beam into the waveguide, a guiding section configured to guide the deflected light beam through the waveguide as a guided light beam, and an out-coupling section configured to couple the light beam out from the waveguide as an expanded light beam whose cross section is larger than the cross section of the deflected light beam;

an optical element which lies beside the waveguide, overlaps the out-coupling section when seen in a direction substantially perpendicular to the parallel sides of the waveguide, and is configured to focus or defocus the expanded light beam as a focused or defocused output light beam; and a display supported by the support, wherein the display is positioned downstream of the optical element and configured to direct the focused or defocused output light beam as an image light beam towards a user's eye for projection.

2. The light projector module according to claim 1, wherein the optical element is configured to provide the output light beam with an aspherical wavefront.

3. The light projector module according to claim 1, wherein the optical element and the display in combination provide the image light beam with a planar wavefront.

4. The light projector module according to claim 1, wherein the optical element and the display in combination provide the image light beam with a spherical wavefront.

5. The light projector module according to claim 1, wherein the optical element is a transmissive optical element.

6. The light projector module according to claim 5, wherein the waveguide has a mirror or a reflective coating at that of said two parallel sides that is far from the optical element.

7. The light projector module according to claim 5, wherein the optical element is a transmissive hologram, a transmissive diffractive optical element (DOE), a transmissive diffractive meta surface, or a liquid lens.

8. The light projector module according to claim 1, wherein the optical element is supported movably in the direction substantially perpendicular to the parallel sides of the waveguide.

9. The light projector module according to claim 1, wherein the optical element lies beside the waveguide at a distance therefrom which is larger than 10 μm and which is smaller than 1 cm.

10. The light projector module according to claim 9, wherein the optical element lies beside the waveguide at a distance therefrom which is larger than 50 μm and which is smaller than 2 mm.

11. The light projector module according to claim 1, wherein the optical element is mounted on the waveguide.

12. The light projector module according to claim 11, wherein the optical element is mounted on the waveguide via a circumferential rim or a set of rails or studs.

13. The light projector module according to claim 1, wherein the out-coupling section has an out-coupling efficiency increasing with distance from the in-coupling section.

14. The light projector module according to claim 1, further comprising a static mirror which lies, in the beam path from the light source to the MEMS mirror, beside the waveguide and overlaps the waveguide when seen in the direction substantially perpendicular to the parallel sides of the waveguide, and is configured to fold the beam path about an angle of folding.

15. The light projector module according to claim 1, wherein the display is a semitransparent combiner or a mirror.

16. A light projector module projecting an image, comprising:

a support:

a light source supported by the support and configured to emit in a beam path a light beam carrying said image;

a micro-electro-mechanical-system (MEMS) mirror supported by the support and configured to deflect the emitted light beam received over the beam path as a deflected light beam;

a waveguide with two parallel sides, supported by the support and having an in-coupling section configured to couple the deflected light beam into the waveguide, a guiding section configured to guide the deflected light beam through the waveguide as a guided light beam, and an out-coupling section configured to couple the light beam out from the waveguide as an expanded light beam whose cross section is larger than the cross section of the deflected light beam;

an optical element which lies beside the waveguide, overlaps the out-coupling section when seen in a direction substantially perpendicular to the parallel sides of the waveguide, and is configured to focus or defocus the expanded light beam as a focused or defocused output light beam;

wherein the optical element is a reflective optical element.

17. The light projector module according to claim 16, wherein the waveguide has a quarter wave plate between the out-coupling section and the optical element and a polariser at that of said two parallel sides that is far from the optical element.

18. The light projector module according to claim 16, wherein the optical element is a reflective hologram, a reflective diffractive optical element (DOE), a reflective meta surface, or a liquid mirror.

19. A light projector module projecting an image, comprising:

a support;

a light source supported by the support and configured to emit in a beam path a light beam carrying said image;

a micro-electro-mechanical-system (MEMS) mirror supported by the support and configured to deflect the emitted light beam received over the beam path as a deflected light beam;

a waveguide with two parallel sides, supported by the support and having an in-coupling section configured to couple the deflected light beam into the waveguide, a guiding section configured to guide the deflected light beam through the waveguide as a guided light beam, and an out-coupling section configured to couple the light beam out from the waveguide as an expanded light beam whose cross section is larger than the cross section of the deflected light beam;

an optical element which lies beside the waveguide, overlaps the out-coupling section when seen in a direction substantially perpendicular to the parallel sides of the waveguide, and is configured to focus or defocus the expanded light beam as a focused or defocused output light beam;

wherein the optical element is mounted on the waveguide; and wherein the waveguide and the optical element are formed as a stack on a common wafer.

* * * * *